Sept. 13, 1938.  A. G. SCAMMELL ET AL  2,129,745
TOWING HOOK FOR MOTOR VEHICLES
Filed June 5, 1937    4 Sheets-Sheet 1

INVENTORS
ALFRED. G. SCAMMELL
OLIVER. D. NORTH
PER Raymer Ho
ATTORNEYS

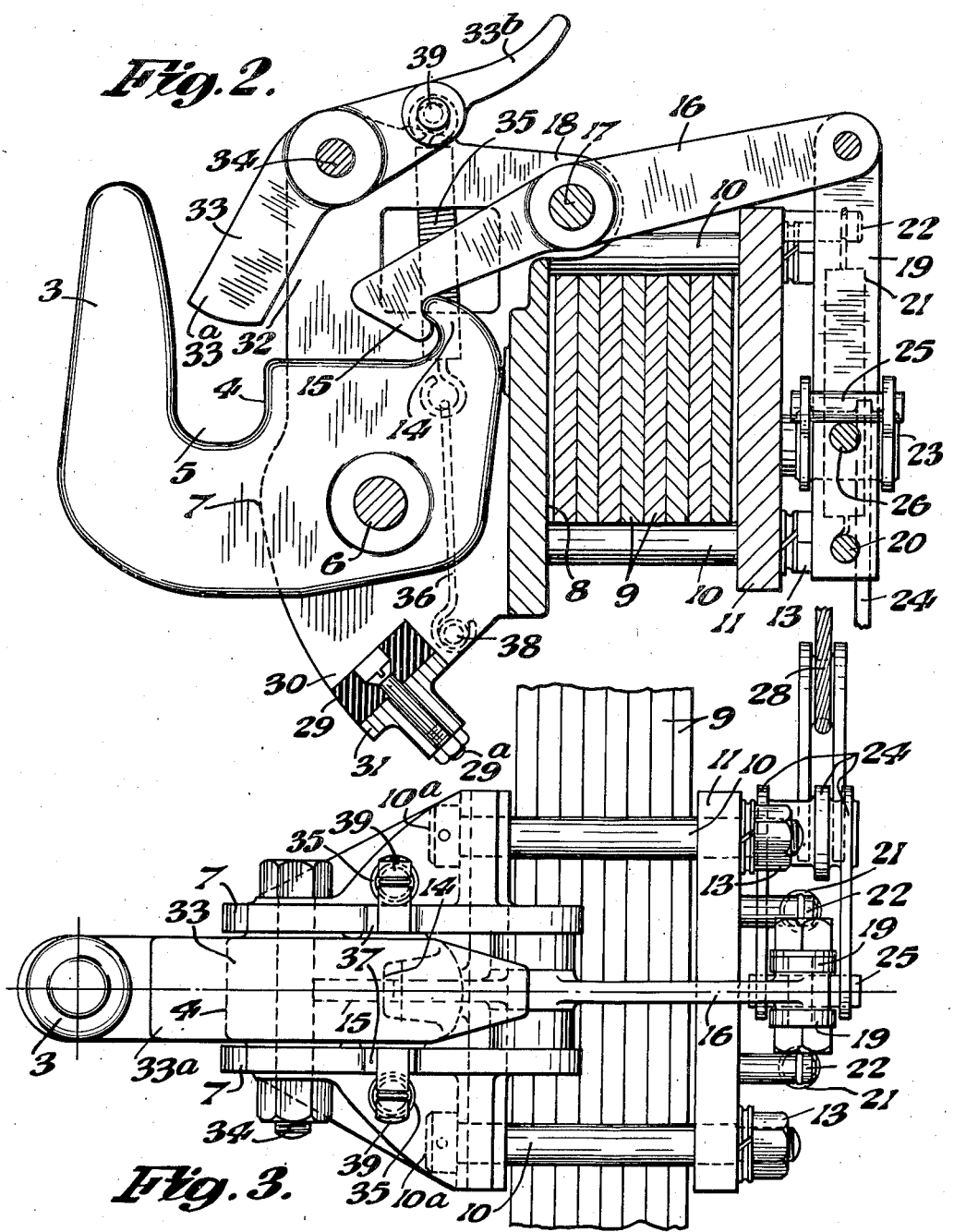

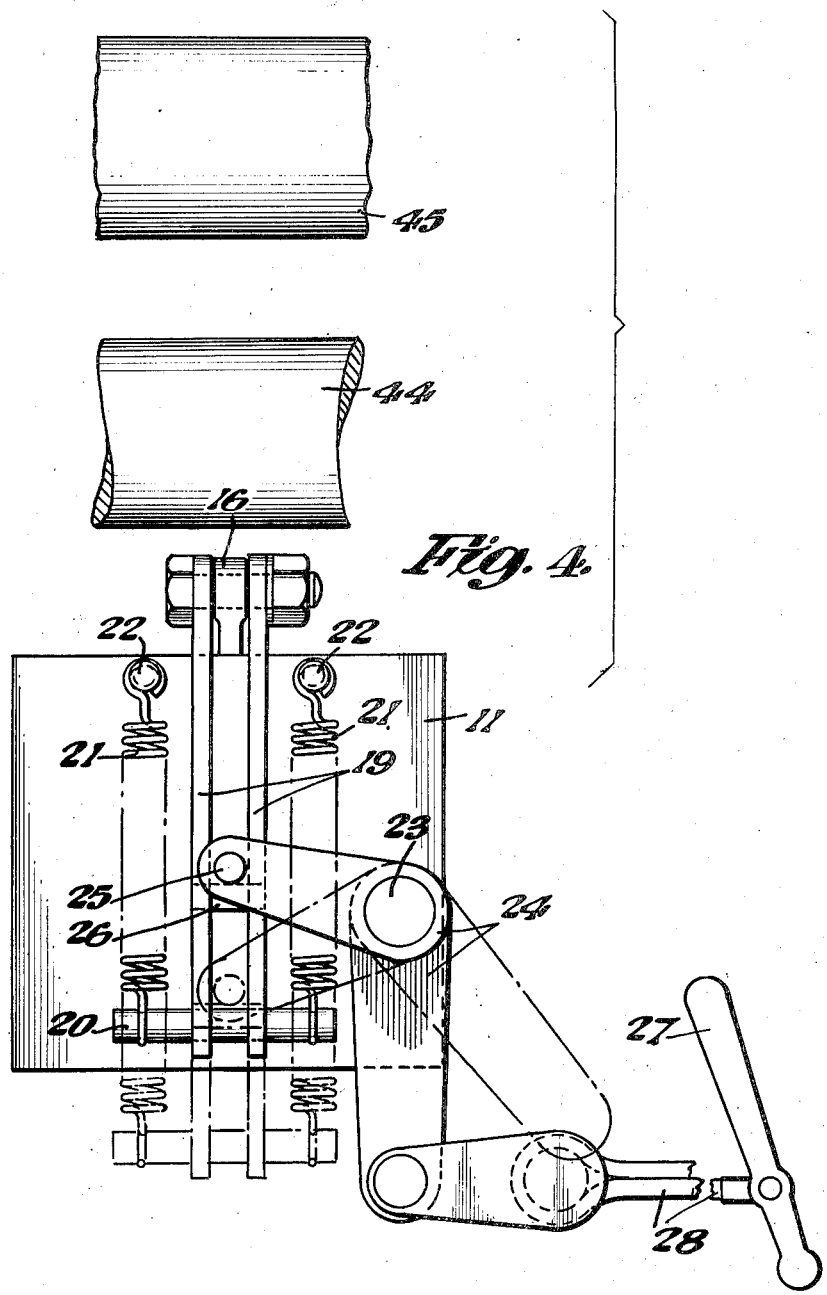

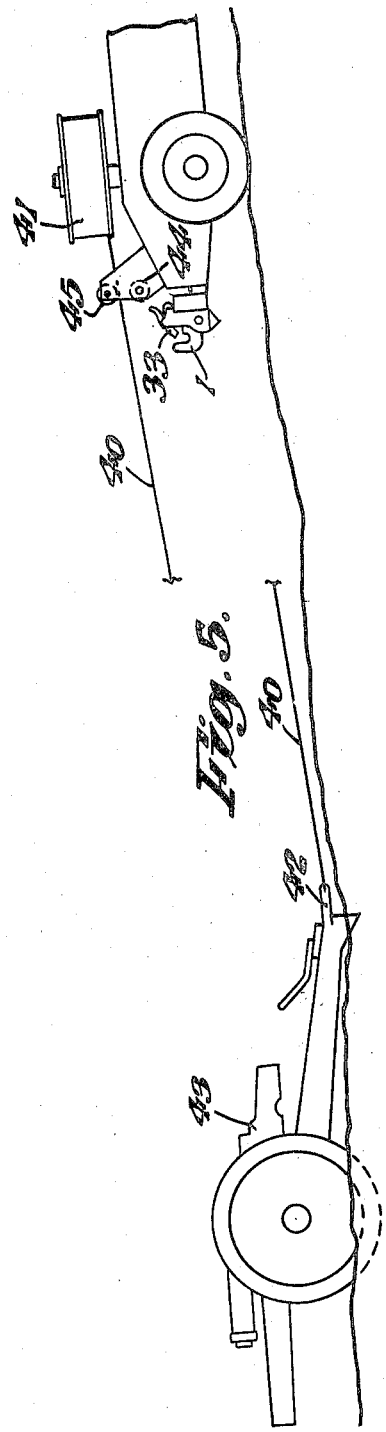

Patented Sept. 13, 1938

2,129,745

UNITED STATES PATENT OFFICE

2,129,745

TOWING HOOK FOR MOTOR VEHICLES

Alfred George Scammell, Watford West, and Oliver Danson North, Hunton Bridge, England Application June 5, 1937, Serial No. 146,646
In Great Britain August 28, 1936

2 Claims. (Cl. 280—33.15)

This invention relates to towing hooks for motor vehicles and has for its object to provide simple and effective means by which the towing hook may be arranged so as to release readily and quickly the vehicle or object being towed whilst at the same time maintaining a safe and reliable connection whilst the vehicle or object is being towed under ordinary conditions.

The invention is particularly applicable to motor tractors intended for drawing heavily loaded vehicles or other heavy objects such as guns or other military equipment. It is found that when towing heavy objects or heavily loaded vehicles over heavy and rough ground the tractor may frequently be brought to a standstill. Under such circumstances progress may best be obtained by quickly releasing the object or vehicle which is being towed when the tractor may proceed a convenient distance after which the heavy object or vehicle may be hauled up to the tractor by a suitable haulage cable operated by a winch on the vehicle. For this purpose it is desirable to be able to release the towing hook quickly and to enable the shackle or other connection to be re-engaged therewith after the hauling operation by the winch and tackle. The present invention provides a quick release towing hook which conforms with these requirements.

According to this invention a towing hook comprises a fixed bracket, a hook pivoted thereto adapted to receive the vehicle to be towed, a locking catch member normally engaged with said hook and restraining the hook against downward pivotal movement to the position to release the trailed vehicle, spring means yieldingly opposing movement of the catch to the hook releasing position, remote control means connected to said catch, and co-operating abutments on the hook and catch adapted to be automatically operatively engaged by upward movement of the hook to the position appropriate to the coupling of the trailed vehicle, said abutments when engaged preventing downward release movement of the hook.

In carrying the invention into practice the towing hook can be pivoted between the side limbs of a substantially U shaped bracket, the towing hook being pivoted about an axis which is arranged out of the line of pull exerted through the towing hook and the shackle or other connection to the object or vehicle being towed. The horn of the towing hook about which the shackle or other connection engages is suitably rounded so as to provide angular freedom of movement of the shackle or other connection in both a lateral and an up and down direction. A suitable safety guard plate is mounted so as to normally close the mouth of the towing hook and is spring-loaded so that it may be pressed back to enable the shackle or other connection to be engaged with the horn of the towing hook after which the guard plate will be moved so as to prevent disengagement of the shackle or other connection from the towing hook. If desired a haulage cable from a winch on the tractor may be arranged to pass through a convenient eye or guide located relatively to the towing hook so that when the winch is operated to haul the vehicle or other object toward the tractor it will bring the shackle or other connection into a position adjacent to the towing hook ready to be engaged therewith. The U-shaped bracket can be attached to the centre of a transverse laminated spring suitably secured at its ends to the towing vehicle, and for this purpose two pairs of bolts can be passed through the centre limb of the U shaped bracket and a back plate to form a shoe or stirrup for the laminated spring, advantage being taken of this back plate to support thereon a bell crank lever connected by a link to the locking catch, this plate also carrying springs opposing release movement of the catch.

In order that this invention may be clearly understood and readily carried into effect four sheets of drawings are appended herewith illustrating an embodiment thereof, and wherein:—

Fig. 2 is a sectional elevation of Fig. 1.

Fig. 3 is a top plan view of Fig. 1.

Fig. 4 is a detail rear elevation view showing a lever for operating the locking catch, and Fig. 5 is a diagrammatic view showing the towed vehicle uncoupled from the towing hook, but coupled to a "winding-in" cable wound on a suitable winch on the towing vehicle.

Figure 1:
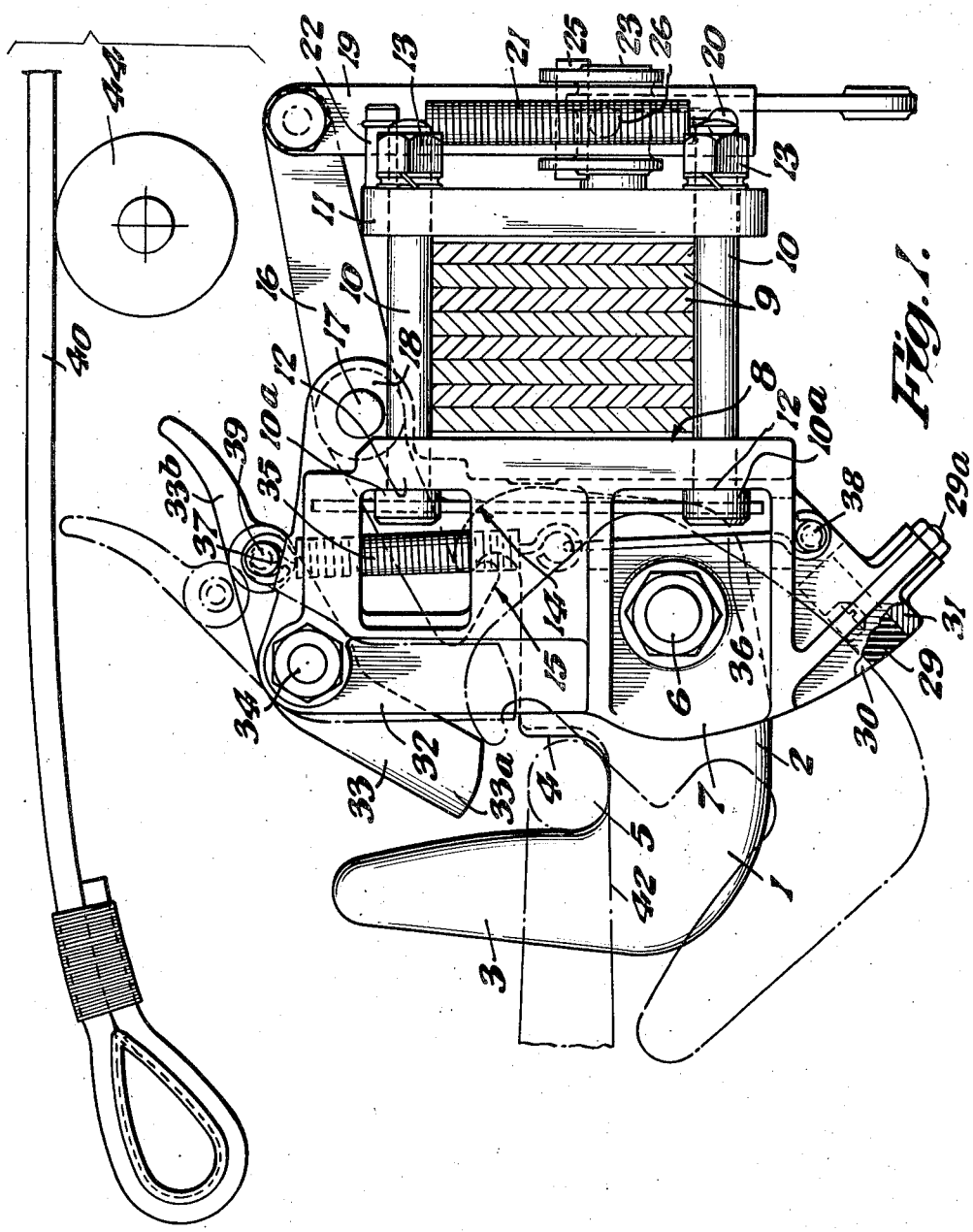
Fig. 1 is a side elevation of the coupling hook and its associated parts.

Referring to the drawings the towing hook is indicated generally by the reference numeral 1 and comprises a normally substantially horizontal limb 2 and an upstanding limb or horn 3 preferably of circular section and tapering towards its upper end. The horizontal limb 2 is of stout construction and is stepped upwards as at 4 just in rear of the horn 3 to provide the recess 5 for the reception of the trail eye or hook of the towed vehicle. The towing hook is pivoted on a stout bolt 6 passed transversely through the side limbs of a U-shaped bracket 7, the centre limb of which has a flat front face 8 against which seats the centre of a laminated leaf spring 9 extending transversely across the rear of the towing vehicle, and suitably secured at its ends to brackets on the towing vehicle. The pivot bolt 6 is preferably arranged below the line of pull exerted between the tractor and the shackle or trail eye or other connection of the vehicle being towed.

A stirrup or shoe for the laminated spring can be obtained by passing two pairs of bolts 10 through the bracket 7 and through a rectangular plate 11, between which and the bracket 7 is gripped the laminated spring. The heads 10a of the bolts abut against steps 12 formed in the outer cheeks of the U-shaped bracket, and the nuts 13 abutting against the front face of the plate 11.

The towing hook 1 is formed with an upstanding and rearwardly directed nose 14 at its upper rear corner and normally this is engaged by a similar but oppositely directed nose 15 on the rear end of a lever 16, forming a locking catch located above the line of pull exerted between the tractor and trail eye or equivalent part of the towed vehicle. This lever 16 is pivoted between its ends on a pin 17 passed through a bifurcated lug 18 integral with the upper part of the bracket 7. The front end of this lever 16 pivotally receives the upper end of a pair of links 19 acting as a single link and located close against and parallel with the front face of the rectangular plate 11. A transverse pin 20 passes through the lower end of the links 19 and has anchored to opposite ends thereof the lower ends of a pair of coiled tension springs 21, the upper ends of these two springs being anchored to a pair of pins 22 fixed in the said plate 11. This plate 11 also carries towards one side a pivot pin 23 for a bell crank lever 24, the upper limb of which carries a uni-lateral pin 25 which bears against an intersecting pin 26 fixed across the pair of links 19. By this means downward movement of the free end of the upper limb of this bell crank lever will pull the links 19 downwards against the influence of the springs 21 and will raise the rear end of the lever 16 carrying the nose 15, resulting in the latter freeing the towing hook 1 which will be free to swing downwards to allow the trail eye or equivalent member of the towed vehicle to slide off the towing hook. The requisite movement of the bell crank lever to effect this operation can be produced by a remote control lever 27 situated near the driver's seat of the towing vehicle, a cable 28 connecting this lever 27 to the bell crank lever 24.

The release, or downward movement of the towing hook 1 is limited by a rubber stop 29 located in an inclined step or recess 30 and resting on the base 31 of such recess, a bolt 29a being passed through such base 31 to secure the rubber stop in position.

The side plates of the bracket 7 between which the towing hook and the locking catch are mounted may be extended upwardly as at 32 to provide a pivotal support for a safety guard plate 33. This comprises a plate pivoted on a bolt 34 between the side plates of the bracket and having a portion 33a extending downwardly close to the top of the horn 3 of the towing hook 1 and thus closing the mouth or entry thereto. A portion 33b of the safety guard plate extends forwardly beyond its pivot and one or a pair of suitable stout tension springs 35 are connected thereto and to one or a pair of pins 36 to serve to hold the guard plate in a position to close the opening to the towing hook. A suitable stop 37 is arranged to prevent this safety guard plate from being moved in an outward direction but it may be pressed inwardly against the action of its springs to enable a shackle or other connection to be engaged with the towing hook after which it will return to the safety position so as to prevent the shackle or other connection from being accidentally disengaged from the towing hook. The pin or pins 36 of the spring connection to the safety guard plate may be secured at their lower ends to a transverse bar or rod 38 passed through the lower end of the bracket 7 and which projects laterally on each side thereof, and the upper ends of the springs can be anchored to a transverse pin 39 passed through the part 33b of the safety guard plate. This part 33b of the guard plate is preferably curved upwards as shown to facilitate its manipulation.

The embodiment of towing hook described is particularly suitable for use on a tractor or towing vehicle in which a hauling cable 40 is wound on a winch 41 carried by the tractor or towing vehicle and is connected at its free end to the trail eye 42 or equivalent part of the towed vehicle 43, which in the embodiment illustrated is a field gun. A suitable guide is provided near the towing hook device so that the towed vehicle can be lifted with its trail eye close to the hook 1. For this purpose a transverse roller 44, is located just above the bracket 7, and the cable 40 passes under tension over this roller to the towed vehicle. This roller is so positioned that when the cable is wound sufficiently to bring the trail eye of the towed vehicle close to the bracket 7 the trail eye will be disposed just above the hook 1. An additional roller 45 is preferably disposed above the roller 44 to avoid displacement of the plane of the cable to an inconvenient position in the event of the tractor being on a steep inclination relatively to the plane containing the trailer.

We claim:—

1. A towing hook device for use on a tractor vehicle, a pivoted hook, a support for said hook, a pivoted locking catch carried by said support and engaged with the hook and adapted to prevent downward swinging movement of the hook to the position appropriate to releasing the towed vehicle, co-operating projections on the hook and catch adapted to be engaged by swinging the hook to the coupled or operative position, a lever carried by said support, a narrowly spaced parallel pair of bars forming a link connecting said catch to said lever, spring means connecting said catch to said support and serving to hold the catch in the hook retaining position, an abutment bridging said pair of bars, a pin projecting laterally from said lever and bearing against said abutment, and remote control means connected to said lever for moving said catch to free the hook.

2. A towing hook comprising a support, a hook member pivoted to the support and adapted to swing downwards to the releasing position, a spring loaded locking catch carried by the support and normally engaged with said hook to lock the hook in the position in which it is ready to receive the trail eye or equivalent coupling element of the vehicle to be trailed, a spring loaded pivoted safety guard member yieldable to afford coupling engagement of the trail eye or its equivalent with the hook but preventing disengagement from the hook when the hook member is locked by said catch, means to actuate the locking catch to free the hook member to swing downwards away from said safety guard member to release the towed vehicle, and co-operating abutments on the hook member and locking catch to automatically lock the hook member when returned to the towing position.

ALFRED GEORGE SCAMMELL.
OLIVER DANSON NORTH.